(12) United States Patent
Kang

(10) Patent No.: US 6,273,524 B1
(45) Date of Patent: Aug. 14, 2001

(54) BRAKING FORCE CONTROL VALVE AND AIR BRAKE SYSTEM WITH THE SAME

(75) Inventor: Gi-Won Kang, Cheonlabuk-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/578,078

(22) Filed: May 23, 2000

(30) Foreign Application Priority Data

Jun. 9, 1999 (KR) ................................................. 99-21283

(51) Int. Cl.$^7$ ....................................................... B60T 8/18
(52) U.S. Cl. .................... 303/9.69; 188/195; 188/349; 303/9.66; 303/9.63; 303/22.1; 303/22.4; 303/22.5
(58) Field of Search ................................. 303/9.69, 9.66, 303/9.75, 22.5, 22.1, 22.8, 22.6, 22.7, 22.4, 28, 40, 7, 9.63; 188/195, 349, 3 H, 3 R

(56) References Cited

U.S. PATENT DOCUMENTS

| | | | |
|---|---|---|---|
| 3,159,433 | * 12/1964 | Clevreux et al. | |
| 3,190,700 | * 6/1965 | Fites . | |
| 3,774,975 | * 11/1973 | Schmidt | ................................ 303/7 |
| 3,964,794 | * 6/1976 | Scholz | ................................ 188/195 |
| 4,040,673 | * 8/1977 | Ahaus et al. | ........................ 303/22.1 |
| 4,300,805 | * 11/1981 | Reinecke . | |
| 5,615,931 | * 4/1997 | Stumpe et al. | ...................... 303/22.1 |
| 5,702,163 | * 12/1997 | Stumpe | ............................... 303/9.62 |
| 5,938,295 | * 8/1999 | Stumpe et al. | ...................... 303/9.69 |

* cited by examiner

*Primary Examiner*—Douglas C. Butler
(74) *Attorney, Agent, or Firm*—Christie, Parker & Hale, LLP

(57) ABSTRACT

A braking force control valve for an air brake system. The air brake system includes an air compressor for generating compressed air, an air tank for storing the compressed air supplied from the air compressor, an air bellows connected to the air tank, a load sensing valve connected to the air bellows to equilibrate braking force applied to front and rear wheels of the vehicle, a brake valve for operating the load sensing valve, a brake chamber for supplying braking force by receiving the compressed air from the air tank when the brake valve is operated. The braking force control valve comprises a valve body provided with a first port connected to the air tank, a second port connected to the air bellows, a third port connected to the load sensing valve, and a valve mechanism for selectively connecting the third port to either the first port or the second port according to a height variation between a body and an axle shaft of the vehicle.

5 Claims, 3 Drawing Sheets

BRAKING FORCE CONTROL VALVE AND AIR BRAKE SYSTEM WITH THE SAME

FIELD OF THE INVENTION

The present invention relates to a braking force control valve for an air brake system of an automotive vehicle, and more particularly, to a braking force control valve that can control braking force by controlling pressure of compressed air supplied to a brake chamber.

BACKGROUND OF THE INVENTION

Generally, an air brake system is designed to generate braking force by using the expansion force of compressed air, and it is generally used for trucks and buses which use an air suspension system.

In a conventional technology of the air brake, the compressed air used for generating braking force is supplied to a load sensing valve through an air bellows. Accordingly, when the air bellows is damaged such that it leaks air, the air pressure supplied to a brake chamber is reduced, deteriorating the braking force.

SUMMARY OF THE INVENTION

Therefore, the present invention has been made in an effort to solve the above problem.

It is an objective of the present invention to provide a braking force control valve for an air brake which can generate sufficient braking force even when an air bellows is damaged or a vehicle is overloaded.

To achieve the above objective, the present invention provides an air brake system for a vehicle comprising an air compressor for generating compressed air, an air tank for storing the compressed air supplied from the air compressor, an air bellows connected to the air tank, a load sensing valve connected to the air bellows to equilibrate braking force applied to front and rear wheels of the vehicle, a brake valve for operating the load sensing valve, a brake chamber for supplying braking force by receiving the compressed air from the air tank when the brake valve is operated, and a braking force control valve disposed between the load sensing valve and the air bellows to adjust air pressure supplied to the brake chamber.

The braking force control valve comprises: a valve body provided with a first port connected to the air tank, a second port connected to the air bellows, and a third port connected to the load sensing valve; and a valve mechanism for selectively connecting the third port to either the first port or the second port according to a height variation between a body and an axle shaft of the vehicle.

The valve mechanism comprises a piston rod slidably inserted into the valve body, a first valve for selectively connecting the second port to the third port according to a sliding motion of the piston rod, a second valve for selectively connecting the first and third portion according to the sliding motion of the piston rod, and a push rod connecting the piston rod to an axle shaft.

According to another aspect, the present invention provides a braking force control valve for an air brake system having an air compressor for generating compressed air, an air tank for storing the compressed air supplied from the air compressor, an air bellows connected to the air tank, a load sensing valve connected to the air bellows to equilibrate braking force applied to front and rear wheels of the vehicle, a brake valve for operating the load sensing valve, a brake chamber for supplying braking force by receiving the compressed air from the air tank when the brake valve is operated, the braking force control valve comprising a valve body provided with a first port connected to the air tank, a second port connected to the air bellows, a third port connected to the load sensing valve, and a valve mechanism for selectively connecting the third port to either the first port or the second port according to a height variation between a body and an axle shaft of the vehicle.

BRIEF DESCRIPTION OF THE DRAWINGS

The accompanying drawings, which are incorporated in and constitute a part of the specification, illustrate an embodiment of the present invention, and, together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings.

Figure 1:
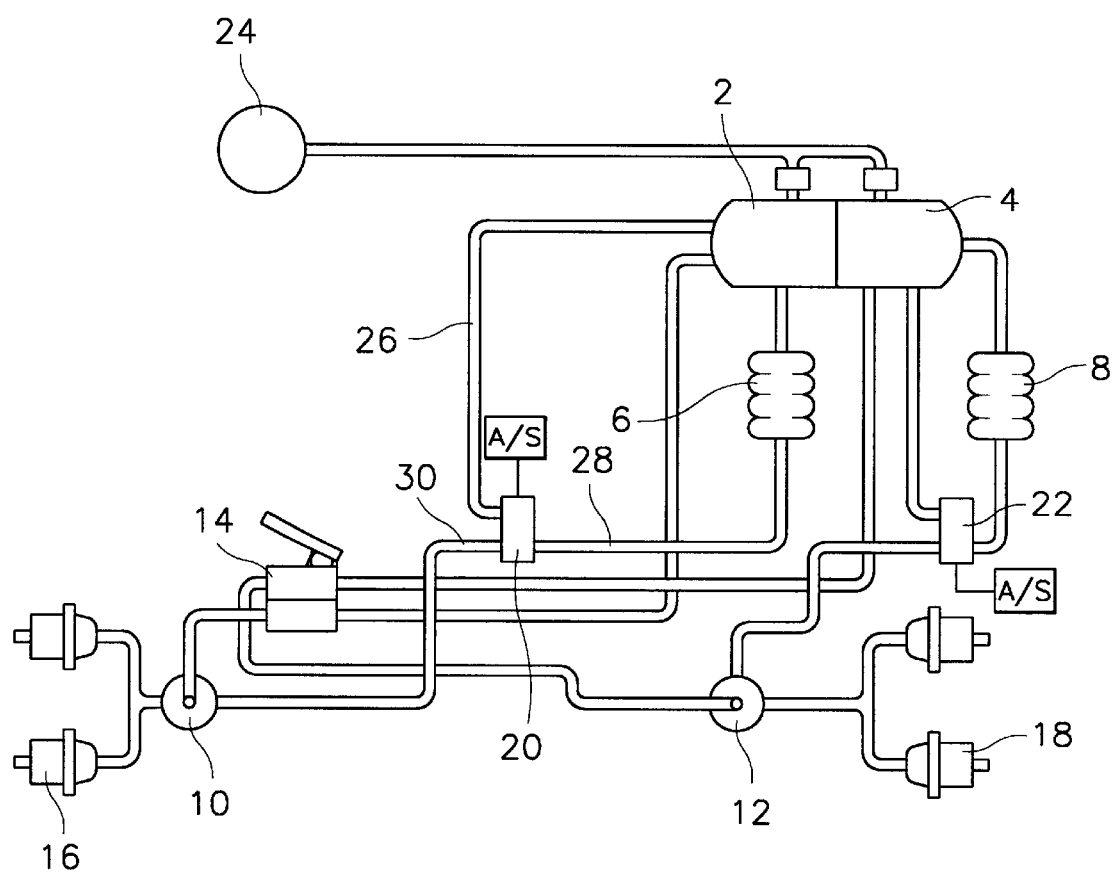
FIG. 1 is a schematic diagram of an air brake system where a braking force control valve according to a preferred embodiment of the present invention is employed.

FIG. 1 shows an air brake system where a braking force control valve according to a preferred embodiment of the present invention is employed.

An air brake system of this embodiment comprises an air compressor 24 for generating compressed air, air tanks 2 and 4 for storing the compressed air supplied from the air compressor 24, air bellows 6 and 8 respectively connected to the air tanks 2 and 4, load sensing valves 10 and 12 connected to the respective air bellows 6 and 8 to equilibrate braking force, brake valves 14 for operating the load sensing valves 10 and 12, brake chambers 16 and 18 for supplying braking force by receiving the compressed air from the respective air tanks 2 and 4 when the brake valve 14 is operated, and braking force control valves 20 and 22 respectively disposed between the load sensing valves 10 and 12 and the air bellows 6 and 8 to adjust air pressure supplied to the brake chambers 16 and 18.

The load sensing valves 10 and 12 adjust air pressure supplied to the brake chambers 16 and 18 to maintain balance of braking force between front and rear wheels.

The braking force control valve 20 is connected to the air tank 2 through a first tube 26, the air bellows 6 through a second tube 28, and the load 20 sensing valve 10 through a third tube 30. Therefore, during a normal drive state, the braking force control valve 20 is designed to communicate the second tube 28 with the third tube 30 such that the compressed air is supplied from the air tank 2 to the load sensing valve 10 through the bellows 6. When the air bellows 6 is damaged or the vehicle is overloaded, the distance between the axle shaft A/S and the body of the vehicle is varied, in the first case because the compressed air from the bellows also feeds the air suspension system (not shown), and in the second case because the overload causes excessive suspension compression. At this point, the braking force control valve 20 is designed to operate according to the height variation of the axle shaft A/S such that it can communicate the first tube 26 with the third tube 30 to directly supply the compressed air from the air tank 2 to the load sensing valve 10. The braking force control valve 22 has the same function as the braking force control valve 20, the description of which will be omitted herein.

Figure 2:
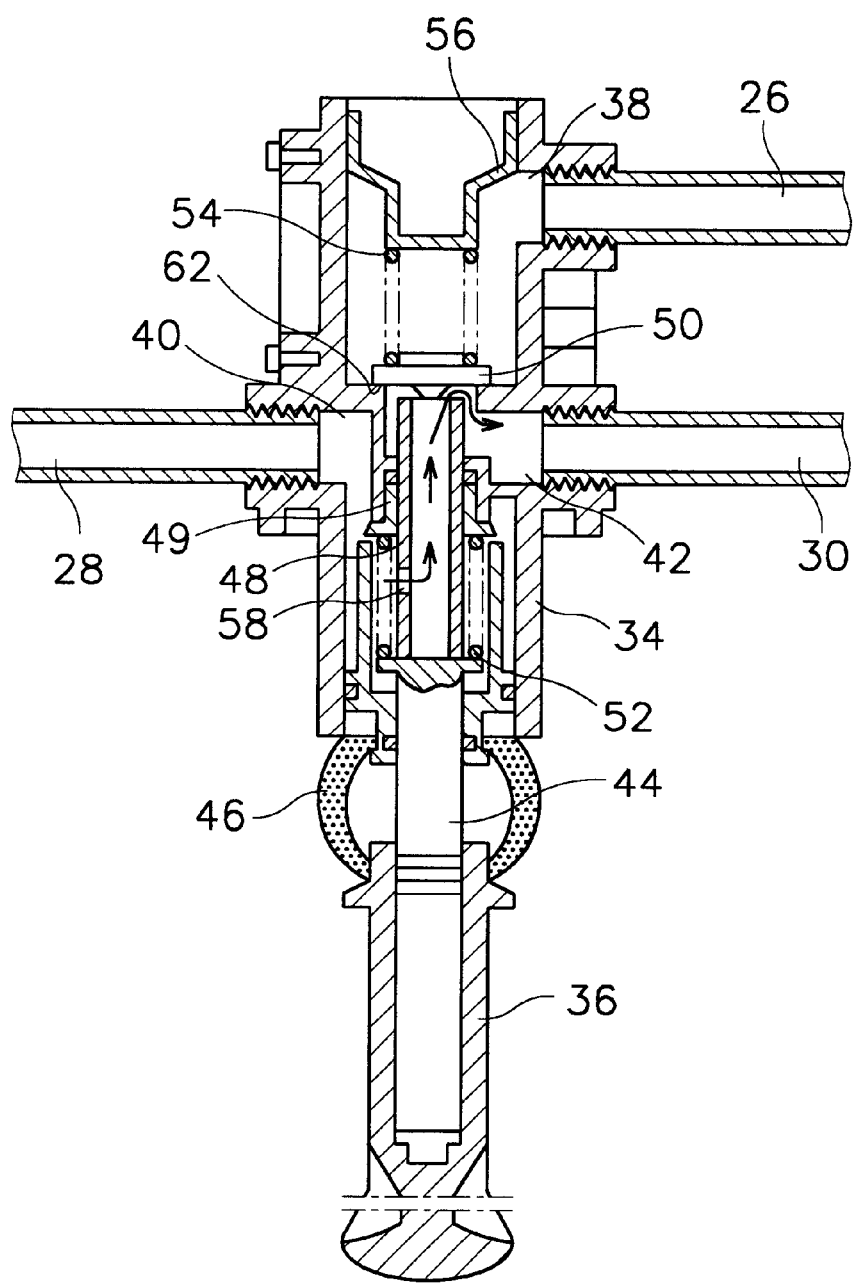
FIG. 2 is a sectional view of a braking force control valve according to a preferred embodiment of the present invention.

FIG. 2 shows such a braking force control valve 22 according to a preferred embodiment of the present invention.

The braking force control valve 22 comprises a cylindrical valve body 34 provided with first, second and third ports 38, 40 and 42 that are respectively connected with the first, second and third tubes 26, 28 and 30, and a push rod 36 disposed coaxially with the valve body 34. Preferably, the valve body 34 is mounted on a vehicle body (not shown) and the push rod 36 is connected at its lower end with the axle shaft A/S. A valve mechanism is disposed within the cylindrical valve body 34. The push rod 36 is coupled to the valve body 34 via a piston rod 44. That is, an upper end of the piston rod 44 is inserted into the valve body, while a lower end is inserted into the push rod 36. A boot 46 is disposed between the valve body 34 and the push rod 36 to protect the piston rod 44.

The valve mechanism comprises a first valve 48 disposed to selectively communicate the second and third ports 40 and 42 with each other, and a second valve 50 disposed to selectively communicate the first and third ports 38 and 42.

The first valve 48 is cylindrical and slidably disposed inside the valve body 34 such that a lower end thereof contacts the piston rod 44. The first valve 48 is provided with a through hole 58 connected to the second port 40. A sliding motion of the first valve 48 is guided by a guide body 49 integrally formed with the valve body 34 and tightly contacting the first valve 48.

Disposed around the first valve 48 between a bottom of the guide body 49 and a top of the piston rod 44 is a first elastic member 52 biasing the piston rod 44 toward the push rod 36.

When the piston rod 44 moves upward while overcoming the first elastic member 52, the first valve 48 also moves upward such that the hole 58 is blocked by the guide body 49, thereby disconnecting the second port 40 from the third port 42.

The second valve 50 is disk-shaped and disposed on a valve seat 62 integrally formed with the valve body 34 to define passage for communicating the first port 38 with the third port 42. The valve body 34 is provided at its upper end with a spring seat 56 and a second elastic member 54 is disposed between the second valve 50 and the spring seat 56 to urge the second valve 50 toward the first valve 48. That is, when the second valve 50 is urged by the second elastic member 54 to contact the valve seat 62, the second valve 50 closes the passage defined by the valve seat 62, thereby disconnecting the first and third ports 38 and 42 from each other.

The operation of the above described braking force control valve will be described hereinafter with reference to FIGS. 2 and 3.

When the air bellows 6 and 8 are not damaged and the vehicle is not overloaded, the braking control valve is operated as shown in FIG. 2.

That is, the first valve 48 is urged downward by the first elastic member 52 while the second valve 50 is urged by the second elastic member 54 to contact the valve seat 62. Accordingly, when compressed air is induced into the second port 40 through the second tube 28 connected to the air bellows 6, the compressed air is directed to the third port 42 through the hole 58, then to the third tube 30.

Figure 3:
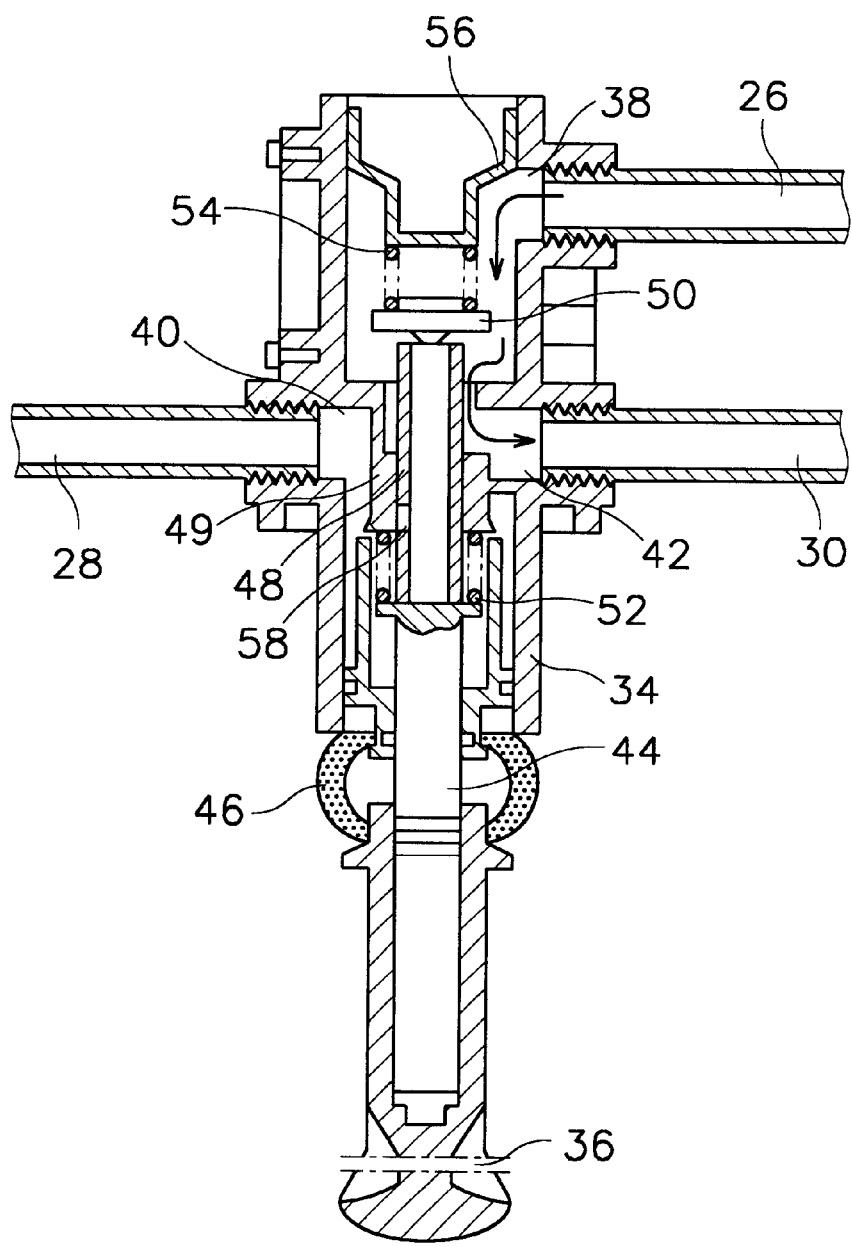
FIG. 3 is a sectional view illustrating the operation state of a braking force control valve according to a preferred embodiment of the present invention.

However, when the air bellows 6 is damaged or the vehicle is overloaded, the braking force control valve is operated as shown in FIG. 3.

That is, the push rod 36 connected to the axle shaft A/S is moved upward to push the piston rod 44. Accordingly, the piston rod 44 overcomes the biasing force of the first elastic member 52 to push the first valve 48 upward, blocking the hole 58 by the guide body 49. At this point, the second valve 50 is pushed upward by the first valve 48, thereby opening the passage defined by the valve seat 62.

Therefore, compressed air stored in the air tank 2 is directed to the third port 42 via the first port 38, then to the third tube 30. At this point, since the hole 58 is closed while the first valve 48 is moved upward, the second port 40 is disconnected from the third port 42.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An air brake system for a vehicle, comprising:

an air compressor for generating compressed air;

an air tank for storing the compressed air supplied from the air compressor;

an air bellows connected to the air tank;

a load sensing valve connected to the air bellows to equilibrate braking force applied to front and rear wheels of the vehicle;

a brake valve for operating the load sensing valve;

a brake chamber for supplying braking force by receiving the compressed air from the air tank when the brake valve is operated; and a braking force control valve disposed between the load sensing valve and the air bellows to adjust air pressure supplied to the brake chamber.

2. An air brake system of claim 1 wherein the braking force control valve comprises: a valve body provided with a first port connected to the air tank, a second port connected to the air bellows, and a third port connected to the load sensing valve; and a valve mechanism for selectively connecting the third port to either the first port or the second port according to a height variation between a body and an axle shaft of the vehicle.

3. An air brake system of claim 2 wherein the valve mechanism comprises a piston rod slidably inserted into the valve body, a first valve for selectively connecting the second port to the third port according to a sliding motion of the piston rod, a second valve for selectively connecting the first and third portion according to the sliding motion of the piston rod, and a push rod connecting the piston rod to an axle shaft.

4. A braking force control valve for an air brake system having an air compressor for generating compressed air, an air tank for storing the compressed air supplied from the air compressor, an air bellows connected to the air tank, a load sensing valve connected to the air bellows to equilibrate braking force applied to front and rear wheels of the vehicle, a brake valve for operating the load sensing valve, a brake chamber for supplying braking force by receiving the compressed air from the air tank when the brake valve is operated, the braking force control valve comprising a valve body provided with a first port connected to the air tank, a second port connected to the air bellows, a third port connected to the load sensing valve, and a valve mechanism for selectively connecting the third port to either the first port or the second port according to a height variation between a body and an axle shaft of the vehicle.

5. A braking force control valve of claim 4 wherein the valve mechanism comprises a piston rod slidably inserted into the valve body, a first valve for selectively connecting the second port to the third port according to a sliding motion of the piston rod, a second valve for selectively connecting the first and third ports according to the sliding motion of the piston rod, and a push rod connecting the piston rod to an axle shaft.

* * * * *